United States Patent

Bradley et al.

[15] 3,635,274
[45] Jan. 18, 1972

[54] VEHICLE RIM AND SIDE RING CONSTRUCTION

[72] Inventors: John N. Bradley, Grosse Pointe Woods; Peter N. Pentescu, Warren, both of Mich.

[73] Assignee: The Budd Company, Philadelphia, Pa.

[22] Filed: Nov. 24, 1969

[21] Appl. No.: 879,228

[52] U.S. Cl. ..........................................................152/410
[51] Int. Cl. .........................................................B60d 25/06
[58] Field of Search.................152/410, 411, 412, 401, 405; 301/63

[56] References Cited

UNITED STATES PATENTS

| | | | |
|---|---|---|---|
| 2,125,756 | 8/1938 | Halteren | 152/411 |
| 3,327,754 | 7/1967 | Travers | 152/410 |
| 3,421,797 | 1/1969 | Walther | 152/410 |
| 2,948,568 | 8/1960 | Hykes et al. | 152/410 |

FOREIGN PATENTS OR APPLICATIONS

| | | | |
|---|---|---|---|
| 352,120 | 5/1905 | France | 152/410 |
| 752,132 | 7/1932 | France | 152/410 |
| 1,172,744 | 10/1958 | France | 152/410 |
| 199,525 | 9/1958 | Germany | 152/410 |

*Primary Examiner*—Arthur L. La Point
*Assistant Examiner*—Richard A. Bertsch
*Attorney*—Thomas I. Davenport, Edward M. Farrell, John B. Sowell, Alford L. Trueax, Jr. and William R. Nolte

[57] ABSTRACT

A wheel rim and side ring combination to provide a stronger wheel for providing more support for a tire on the rim and reducing stresses in the rim gutter.

2 Claims, 3 Drawing Figures

PATENTED JAN 18 1972

3,635,274

INVENTORS
JOHN N. BRADLEY
BY   PETER N. PENTESCU

*A. L. Truesay, Jr.*
ATTORNEY

VEHICLE RIM AND SIDE RING CONSTRUCTION

This invention relates to motor vehicle wheels and more particularly to a rim and side ring construction therefor.

Wheel rim and side ring construction presently in use and disclosed in the prior art generally require a heavy gutter extension or some means of reinforcing the gutter structure to withstand the loads imposed thereon.

It is an object of this invention to provide a wheel rim and side ring construction that will reduce the loads imposed on the gutter of a wheel rim and permit a reduction in the overall rim gage thus producing a more economical rim.

This and other objects of this invention will become more apparent as reference is made to the following specification and drawing.

Figure 1:
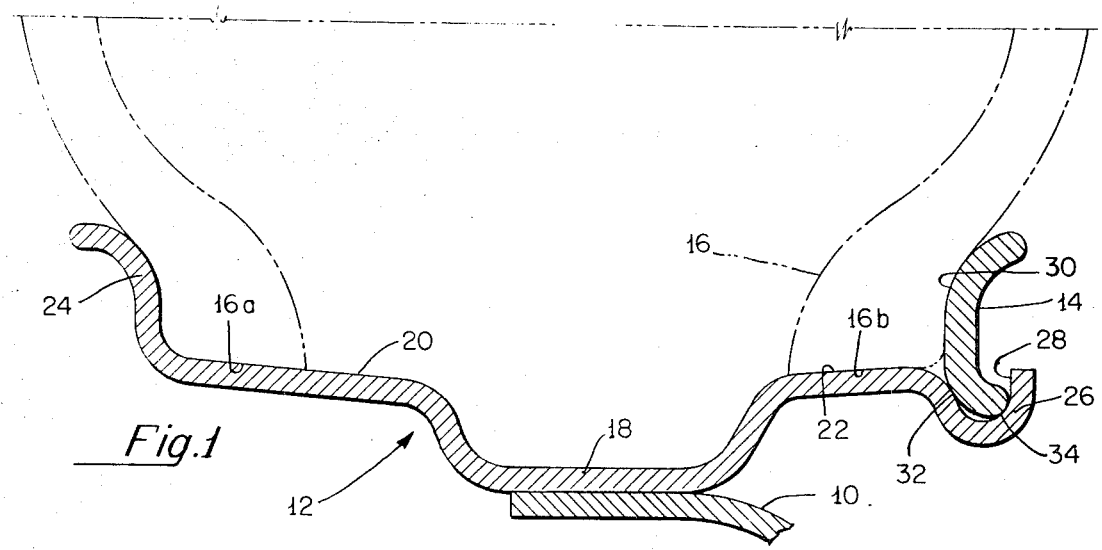
FIG. 1 is a cross-sectional view of the novel rim and side ring with a tire, shown in phantom, mounted thereon.
Figure 2:
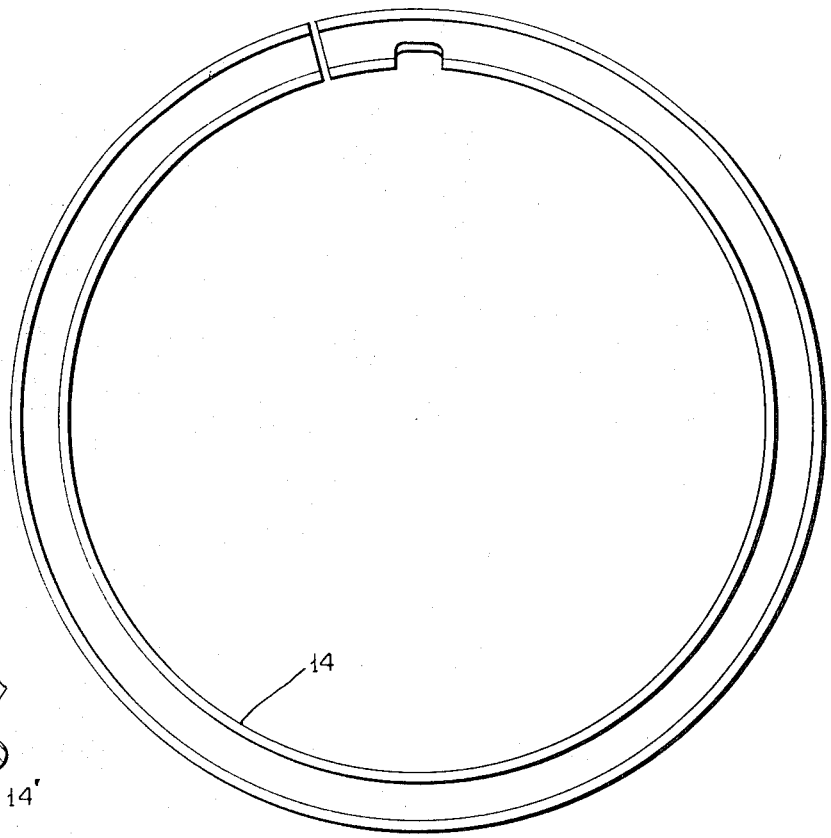
FIG. 2 is a plan view of the novel side ring.

Referring now to the drawings, as seen in FIG. 1, a wheel disk 10 is secured to and supports the novel rim 12, side ring 14 and conventional tire 16.

The rim 12 is formed with a drop center portion 18 and tapered bead seats 20, 22 sloping outwardly radially in axial directions on each side of the drop center. The bead seat 20 is integrally connected to a side flange 24 extending radially fro the outer edge of the bead seat. Extending axially from the outer edge of bead seat 22 is a gutter extension 26 which is radially inward (or below) the outer edge of the bead seat 22. The gutter extension 26 has a semicircular cross section with an arcuate inner surface 28 for cooperating with the C-shaped side ring 14 to retain the tire on the bead seat 22.

The tire beads 16a, 16b rest on the bead seats 20, 22 respectively and the side flange 24 retains one side of the tire 16 on the rim 12 and the side ring 14 retains the other side of the tire on the rim.

The transversely divided C-shaped side ring 14 has the back portion 30 of the "C" contact the side of the tire 16 and holds the bead 16b entirely on the bead seat 22. The lower portion 32 of the C-shaped side ring 14 engages radially outer a portion of the arcuate surface 28 below the junction of the bead seat 22 and the gutter extension 26 for aligning the edge of the tire with the edge of the bead seat 22. The lower hook portion 34 engages the radially outermost portion of the arcuate surface most remote from the junction of the bead seat 22 and gutter extension 26. Thus, the load imposed on the gutter extension 26 by the C-shaped side ring 14 would only be the necessary force to resist sideward movement of the tire 16.

Figure 3:
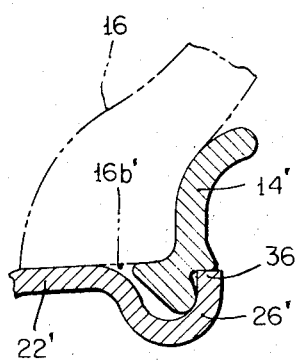
FIG. 3 is a cross-sectional view of the prior art ring ad portion of the rim.

In the prior art, as seen in FIG. 3, a portion of the bead 16b' rests on the bead seat 22' and on the side ring 14'. The side ring 14' also rests on the outer edge 36 of the gutter extension 26'. Therefore, the load imposed on the gutter extension 26' would be the resultant force of the sideward thrust of the tire 16' plus the downward thrust of the bead 16b'; while, the novel C-shaped side ring 14 only resists the sideward thrust of the tire. Since less load is imposed on a gutter extension using this novel C-shaped side ring, a lighter gage gutter extension is required providing a savings in material.

What is claimed is:

1. In a vehicle wheel, a rim and side ring construction for supporting a tire comprising in combination a rim having a drop center and on each side of said drop center a tapered full-width bead seat for the tire beads, said bead seats sloping outwardly radially in an axial direction from said drop center, an integral side flange extending radially from the outer edge of one of said bead seats for retaining and supporting one side of the tire, a generally semicircular cross-sectioned integral gutter extension extends axially from the outer edge of the other of said bead seats, said gutter extension having a gutter portion located radially below the outer edge of said rim and including an arcuate inner surface, and a tire-retaining side ring means for cooperating with the arcuate surface of said gutter extension and a side of the tire for retaining the bead of the tire on said bead seat, said side ring means including a generally C-shaped cross section locking ring divided transversely for ease of insertion and removal from engagement with the tire and cooperation with said gutter extension, said C-shaped lock ring including a back portion of the "C" for engaging the tire and holding the tire bead on said beat seat and for engaging the radially outer portion of said arcuate surface adjacent said beat seat for aligning the edge of the tire with the edge of said bead seat and a lower hook portion of the "C" for engaging the radially outermost portion of said arcuate surface most remote from the outer edge of said bead seat, said back portion contact and said lower hook portion contact being the only contacts of said side ring with said arcuate surface.

2. The rim and said ring construction as claimed in claim 1 having said back portion of said lock ring engaging said arcuate surface adjacent said bead seat and said lower hook portion engaging said arcuate surface for transmitting said thrust imposed on said back portion of the lock ring by the tire to said gutter extension and the radially outermost portion of said gutter extension cooperating with said lock ring for resisting said side thrust whereby the forces acting on the gutter extension places the gutter extension in tension.

* * * * *